July 14, 1959     V. E. CARBONARA     2,894,330
ASTROCOMPASS
Filed July 23, 1952     6 Sheets-Sheet 1
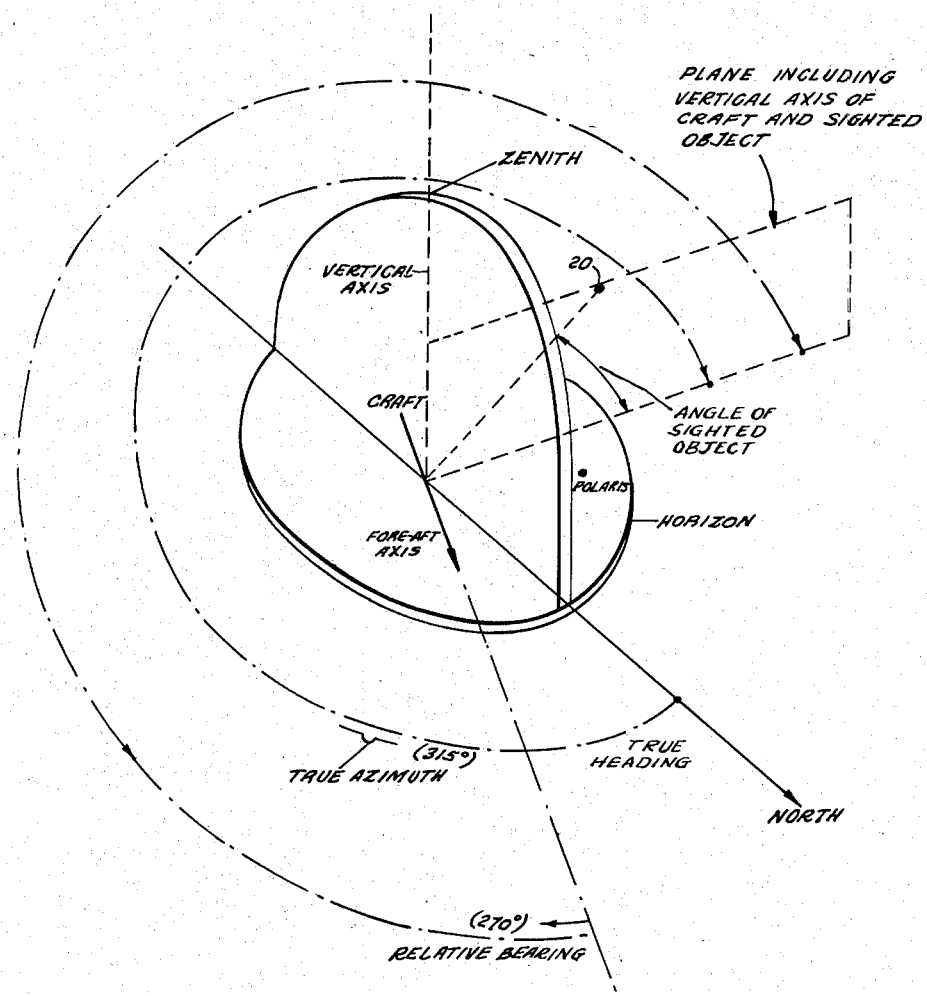
INVENTOR.
Victor E. Carbonara
BY
Ostrolenk & Faber
ATTORNEYS July 14, 1959
V. E. CARBONARA
2,894,330
ASTROCOMPASS
Filed July 23, 1952
6 Sheets-Sheet 2
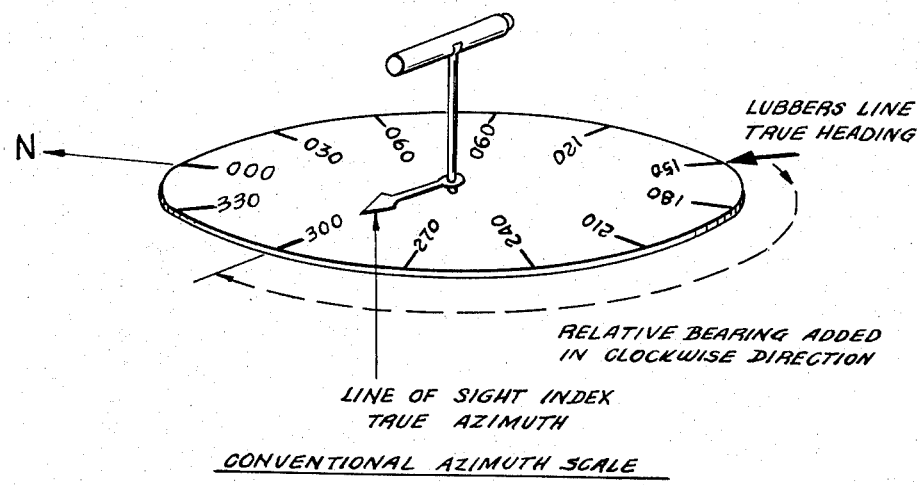
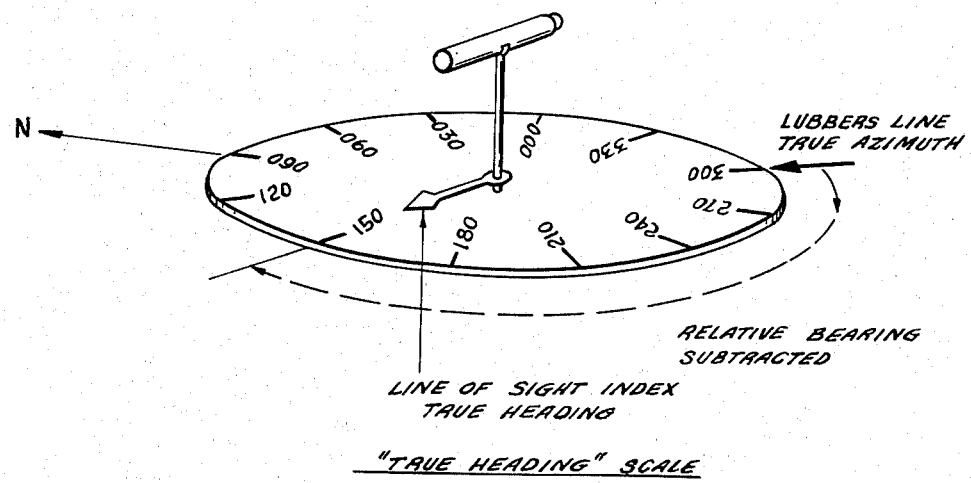
INVENTOR.
VICTOR E. CARBONARA
BY
Ostrolenk & Faber
ATTORNEYS

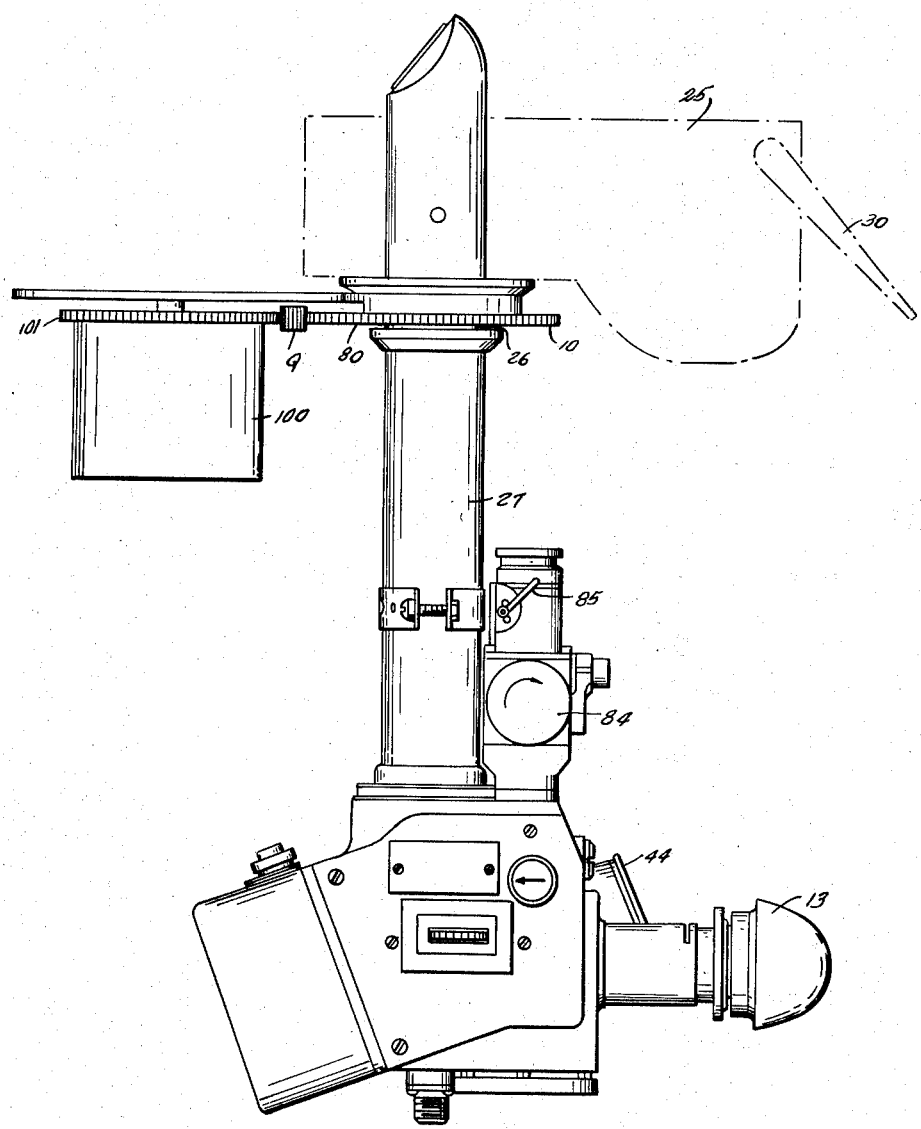

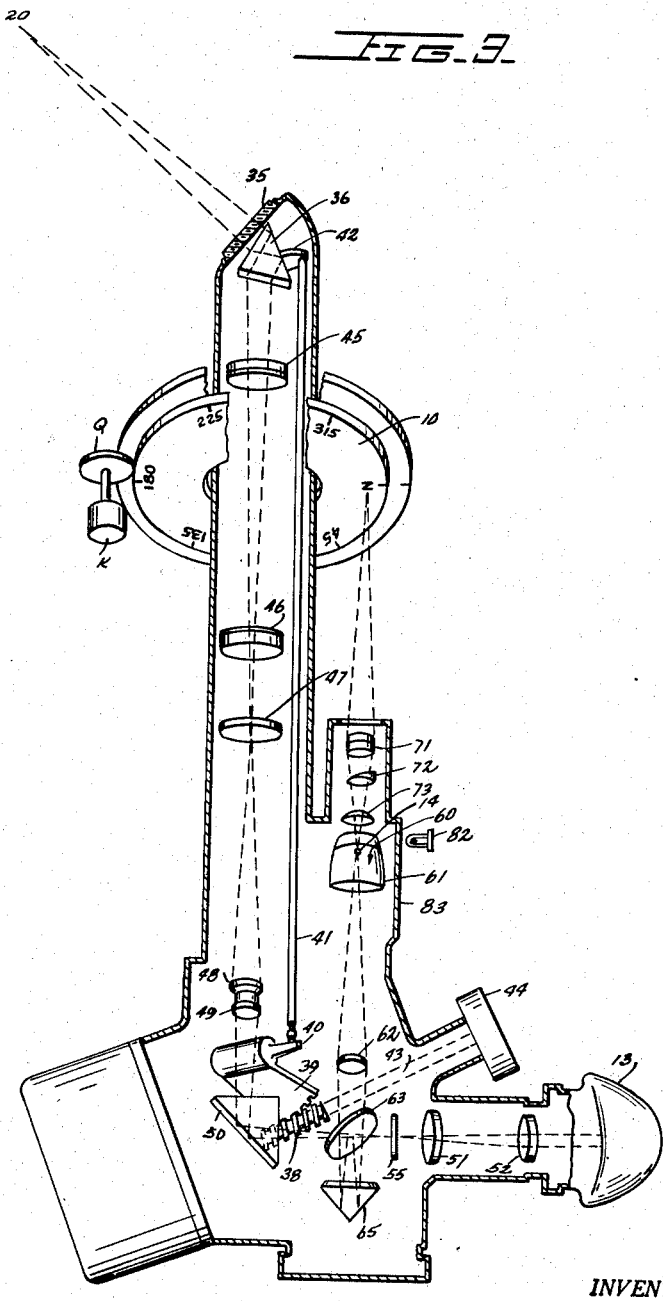

July 14, 1959  V. E. CARBONARA  2,894,330
ASTROCOMPASS
Filed July 23, 1952  6 Sheets-Sheet 5

RANDOM ORIGINAL POSITION

SET FOR TRUE AZIMUTH
SIGHTING MEANS STILL
AT RANDOM

SIGHT TAKEN AND
TRUE HEADING SIGHTED

INVENTOR.
VICTOR E. CARBONARA
BY
Ostrolenk & Faber
ATTORNEYS

July 14, 1959 V. E. CARBONARA 2,894,330
ASTROCOMPASS
Filed July 23, 1952 6 Sheets-Sheet 6
INVENTOR.
VICTOR E. CARBONARA
BY
Ostrolenk & Faber
ATTORNEYS

United States Patent Office 2,894,330
Patented July 14, 1959

2,894,330

ASTROCOMPASS

Victor E. Carbonara, Manhasset, N.Y., assignor to Kollsman Instrument Corporation, Elmhurst, N.Y., a corporation of New York Application July 23, 1952, Serial No. 300,482

12 Claims. (Cl. 33—61)

My present invention is a continuation-in-part of application Serial No. 222,113, filed April 20, 1951, now abandoned, and relates to the adaptation and utilization of the type of periscopic sextant shown in my Patent No. 2,579,903 and the mount therefor shown in my Patent No. 2,554,010 as an instrument which functions as an improved astrocompass to provide a continuously available accurate reading of the true heading of the craft in connection with which it is used.

In the construction and operation of aircraft, whether of military or commercial design, it is of utmost importance to reduce not only the weight and size of all appurtenances but also to arrange all instruments and elements in such manner that interference with the most efficient aerodynamic form of the craft is minimized or, if possible, altogether obviated.

In long range craft operating in areas where external navigational aids such as directional beacons or loran systems could not always be relied upon or could not always be used (as on many military missions) the efficient aerodynamic design of the craft was originally modified to provide suitable observation means such as a transparent dome by means of which the navigator was enabled to take observations over a desired arc or field of view without interference with his line of sight by portions of the craft.

Such domes decreased the speed of the craft and were vulnerable not only in a military sense but also to various unexpected aerodynamic forces.

The periscopic sextant and the hatch of my above-mentioned patents provided a means for obviating the dome and substituted therefor a tubular member of the order of 1.37" in diameter which projected beyond the roof of the craft a distance of less than 2". The hatch and support for the tube of the periscopic sextant were arranged so that the sextant could be withdrawn if desired and the 1.37" opening closed. The hatch member included also a universal support for the sextant tube so that the tube could be swung to and held at vertical position irrespective of the momentary attitude of the craft; the sextant and its tube were rotatable in azimuth and a prism member behind an observation window at the end of the tube was rotatable in a vertical plane about a horizontal axis to enable a sight to be taken on any celestial object.

While this periscopic sextant solved the problem with respect to location on the earth's surface, another problem arose particularly with respect to navigation in northern latitudes where magnetic compasses failed completely. That problem was one of periscopically providing an accurate means for determining true heading (the angle of the longitudinal axis to a north south axis) of the craft.

While most military and commercial aircraft carry directional gyros to provide an immediate indication to the pilot of the true heading of his craft, such gyros are subject to drift and since they have no outside frame of reference (as does a magnetic compass) the nature of the drift and the compensation required to correct for the drift must be provided by another device. They are used because they provide an immediate continuous indication of heading to the pilot without dependence on external factors or human observation but must, in turn, be corrected or at least checked frequently by external factors to ensure that the heading indication given thereby is correct.

In latitudes within the United States and south thereof, a magnetic compass corrected for the magnetic attributes of the craft itself and corrected by application of variation obtained from the chart of the particular location as determined by the navigator may be used to check and correct the gyro. The directional gyro bearing card may be rotatably mounted and slaved by appropriate synchro mechanism to the magnetic compass.

Even in such latitudes, and necessarily in northern latitudes, the best method for checking true heading to provide needed correction from time to time of the gyro is that which entails celestial observation to determine the relative bearing of the axis of the craft to a celestial body; this, in turn, coupled with means for determining the azimuth of the celestial body provides a means for determining the true heading of the craft. This true heading determined in this fashion provides the means for checking and, if necessary, correcting the gyro or any other direction or heading indicating device used by the pilot.

The device previously utilized for such determination by celestial means of the true heading of the craft has been known as an astrocompass. Prior astrocompasses were of such nature that a transparent dome in the roof of the craft was needed to make appropriate observations.

In that type of navigation, therefore (in northern latitudes, for instance) which required an astrocompass to provide a clear determination of true heading, the need for the dome to make the astrocompass operative made a periscopic construction of the sextant to determine location unnecessary. Since the dome was necessarily present, a hand-held non-periscopic sextant could be used.

The primary object of my invention is the novel arrangement and construction of my periscopic sextant so that it may be used as an astrocompass (a true heading indicator) as well as a sextant (a location indicator).

By this arrangement and construction of my periscopic sextant, the need for an additional expensive and cumbersome astrocompass is obviated, the need for an astrodome for any purpose is obviated, and means are provided which with a minimum of manipulation will provide a reading of location and true heading simultaneously.

Essentially, my invention contemplates the provision of a 360° rotatable compass rose preferably mounted on the support for the tube of the periscopic sextant. The compass rose is viewed from below and its graduations are marked in a clockwise order corresponding to a counterclockwise reading of the angles as viewed from above contrary to the ordinary compass rose. A stationary lubbers line is provided aligned with the fore-aft axis of the craft where it is visible under the sighting index when the sextant is aligned with the nose of the craft. As the periscopic sextant is rotated to sight a celestial body, the index line of the sextant traverses the disc (or an image thereof). The disc or compass rose is first rotated to set the known (or computed) azimuth of the celestial body to be observed against the lubbers line; the disc then remains stationary.

Then, when the sighting mechanism is set or aligned on the celestial body, the true heading of the craft is indicated under the sighting index. This direct reading of the true heading is made possible by the arrangement of the gradations on the disc or compass rose as above noted which in turn provides for an automatic subtraction of relative bearing of the celestial body with respect to the fore-aft axis of the craft from the azimuth of the celestial body.

True heading is the direction of the craft's fore-aft axis measured about the vertical axis (zenith-nadir) from the north point of the horizon in a clockwise sense as seen from the zenith looking down.

True azimuth is the direction of a celestial body measured about the vertical axis of the craft's local geographic position in a clockwise sense from the north point of the horizon, looking down from the zenith.

Relative bearing is the angle between the fore-aft axis of the aircraft and the horizontal line to the celestial body measured clockwise about the vertical axis looking down from the zenith.

The true heading (TH) equals true azimuth (TA) minus relative bearing (RB).

$$TH = TA - RB$$

True heading is the result which my novel device is intended to determine.

True azimuth may be compounded from tables or, as a modification of my invention, may be obtained automatically from a computer.

Relative bearing is obtained by sighting the celestial body.

Since there is only one unknown quantity to be determined and two known quantities are provided by my device, the determination of the single unknown, the true heading, now becomes a simple matter.

While, in describing the problems involved, particular reference has been had to aircraft, it will be obvious that the periscopic nature of my novel device adapts it for use in submarines or other vehicles or observation points where it may otherwise be difficult to obtain a sight over a substantial arc.

Also, the simplified construction of my device makes it readily adaptable to universal navigational use on shipboard or elsewhere. Nor need my novel device necessarily be periscopic in nature although that type of construction actually simplifies the operation of my device, particularly as an astrocompass.

In the operation of my novel device as an astrocompass, it is essential that the observation point have an axis of rotation for the sighting means which actually is or may be mechanically or electromechanically translated into an axis perpendicular to and at the center of the compass rose or disc which is first set for the true azimuth.

Another object of my invention, therefore, is the provision of a sighting device having an axis of rotation normal to and passing through the center of a compass rose or disc wherein the compass rose or disc is first set against a lubbers line for the true azimuth of the object sighted and the sighting index will then read in terms of true heading of the lubbers line.

It is essential in such a sighting device that the axis of rotation be at all times maintained at a true vertical. For this reason, some vertical reference such as a bubble must be provided and an index must be provided to indicate correct vertical orientation of the sighting device with respect to the bubble.

Another object of my invention, therefore, is in such a sighting device, the provision of reference means for determining vertical orientation, an index with respect to which vertical orientation may be read and especially means for bringing simultaneously into a single eyepiece the vertical orienting reference, the index line therefor and the image of the compass rose or disc (or, better termed, true heading scale) in registry with the index line.

It is also, of course, essential that the celestial object with respect to which observations are taken and which determines all of the readings be not only kept in view but also maintained on the index line and on another index line normal to the first index line to ensure proper operation of the instrument.

Accordingly, another object of my invention, therefore, is the provision of means for bringing into a single eyepiece an image which combines the celestial object to be viewed, the index lines, the vertical reference (such as the bubble) and the portion of the azimuth scale adjacent the vertical index.

Another object of my invention is the provision of means for automatically setting the azimuth scale for the proper true azimuth of a perpendicular celestial object to be utilized as the principal reference and for automatically maintaining the setting and correct true azimuth despite the passage of time so that the observer may, at any time he may take a sight on the particular celestial object, necessarily and automatically be provided with a reading of true heading.

Another object of my invention is the provision of a computer for the foregoing purpose having an output which continuously adjusts the azimuth scale setting for true azimuth of the particular celestial object for which it is set and which also corrects the setting of the azimuth scale for latitude and longitude so that the observer need merely center the object in the eyepiece and obtain an immediate reading in the eyepiece of true heading as well as a reading of the latitude on the appropriate portion of the instrument.

The foregoing and many other objects of my invention will become apparent in the following description and drawings in which:

Figure 1 is a diagram showing the nature of the computation which my novel periscopic sextant modified to act as an astrocompass is to perform.

Figure 1A is a schematic view of a conventional azimuth scale with graduations in a clockwise direction.

Figure 1B is a view of a true azimuth scale according to my invention with graduations counterclockwise.

Figure 2 is a side view of my novel periscopic sextant modified to act as an astrocompass.

Figure 3 is a longitudinal section through the periscopic sextant-astrocompass of Figure 2 with certain of the parts shown schematically.

Figure 7 is a schematic showing of a computing device for determining, setting and maintaining the azimuth of a selected celestial object.

Figures 7A and 7B are schematic showings of different positions of a portion of the computing device of Figure 7.

Figure 7C is a diagram illustrating a portion of the operation of the computer of Figure 7.

Figure 4:
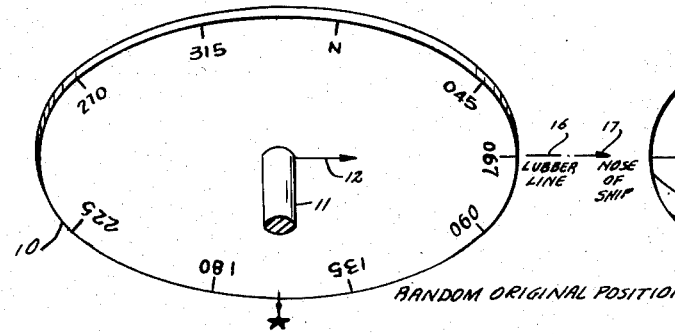
Figures 4, 5 and 6 are schematic views showing successive steps to be performed with the compass rose or azimuth scale of Figure 3 to solve the problem presented by the factors of the diagram of Figure 1.
Figure 4A:
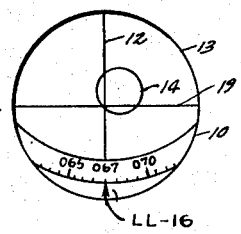
Figures 4A, 5A and 6A show readings in the eyepiece of the periscopic sextant astrocompass corresponding to the different positions of the azimuth scale of Figures 4, 5 and 6—the reading in Figure 6A showing the 45° true heading of the craft in the diagram of Figure 1.
Figure 5:
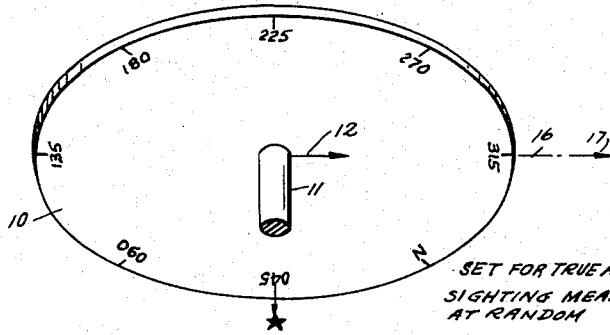
Figure 5A:
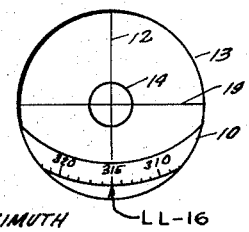
Figure 6:
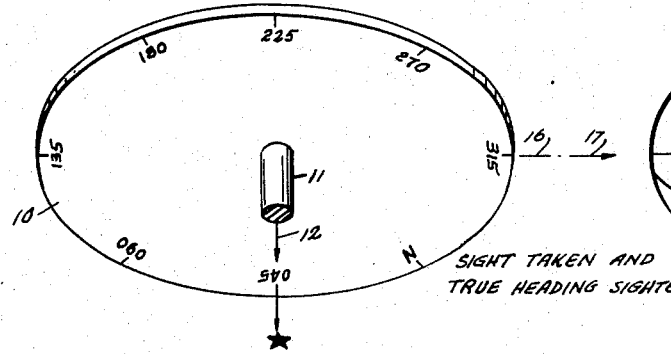
Figure 6A:
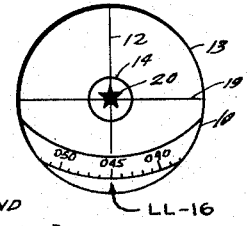

The essential element of my invention is expressed in Figures 4, 5 and 6 and associated Figures 4A, 5A and 6A which show how my novel azimuth scale, when arranged as shown in Figures 2 and 3, solves the true heading problem presented in Figure 1.

The computing device of Figures 7, 7A, 7B and 7C is extremely useful and perhaps essential in practical operation by a busy navigator. The function of the computing device is to operate the azimuth scale from the Figure 4 or random position to the Figure 5 position where the azimuth scale is set for azimuth of the celestial object to be used as the means for determining true heading of the craft. The computing device may also be arranged so that it will automatically and continuously adjust the celestial object azimuth setting of the azimuth scale for location and time. With the computing device so arranged, the navigator will read true heading in the eyepiece every time he takes a sight on the celestial object for which the azimuth setting is made.

Should the computing device be omitted, then the azimuth scale may be manually adjusted for true azimuth of the celestial object which is to be used as a reference for determining true heading by manual operation of pinion Q by knob K (as schematically shown in Figure 3) after determination by the navigator of position and time and after reference by the navigator to appropriate tables.

Preferably, and because automatic setting and maintenance of the true azimuth is, at least, useful, and more often essential where the navigator has many duties to perform, the computing device is made a part of the entire unit and is in essence integrated therewith.

*Navigational background of the true heading indicator or astrocompass*

The basic computation which must be made to determine true heading is shown schematically in Figure 1.

From this diagram, it will be seen that true azimuth of the sighted object equals true heading plus relative bearing of the object with respect to the craft.

$$TA = TH + RB$$

Where the TA of the sighted object is 315° and the RB of the sighted object with respect to the craft is 270°, then the TH of the craft is 45°.

Transforming by algebra, the formula becomes more usefully: True heading equals true azimuth minus relative bearing.

$$TH = TA - RB$$

Since the RB of the object is to be a subtracted angle, the desired result can be obtained by reversing the conventional sense of graduation of the angle scale, so that rotation of the eyepiece and reading index with the periscope in the clockwise direction as seen conventionally from above is in the direction of descending scale values. A scale so graduated runs clockwise as seen from below. At the same time, the scale zero must be rotated clockwise as seen from above, or counter-clockwise as seen from below, when the value TA is put in.

For any given moment from any given geographical position, the direction of any visible navigational star or celestial object may be calculated. This direction measured clockwise (from above) about the local zenith-nadir (vertical) axis from the true north is known as the true azimuth. This determination is obtained by solution of the spherical triangle whose vertices are the known or assumed local position, the instantaneous position of the sub-stellar point and the nearer pole.

Local position may be fixed in any of several ways; but, where pilotage and radio aids are not available, the position is obtained by comparing the measured altitudes of two or more stars above the horizon with altitudes obtained from computing the above mentioned spherical triangle.

Therefore, azimuth, as obtained from readily available data, is employed in obtaining the original setting (compare Figures 5 and 5A with the true azimuth angle of 315° of Figure 1) of the horizontal scale of the device.

Once this setting of true azimuth has been made with respect to the lubbers line (see Figure 5) which is a line fixed on the instrument, stationary with respect to the ship, and representing the direction of the ship's nose, then rotating a sighting member about an axis at the center of the scale until the sighting member is aligned with the celestial object mechanically reproduces the difference between azimuth and true heading. This permits the true heading angle to be read directly off the scale (see Figure 6).

*Mechanical solution of the true heading angle*

This is the essence of the invention and has already been referred to.

The method of mechanical solution of the true heading angle may be seen by comparison of Figures 4, 5, 6 with Figure 1.

A compass rose or azimuth scale 10 (Figures 4 to 6) is arranged for horizontal rotation about a vertical axis 11.

An index line or pointer 12 is arranged for rotation about axis 11 to be aligned with the line of sight of the celestial object which furnishes the basis of the computation.

Figures 4 and 4A represent a random position of azimuth scale 10 and pointer 12. Figure 4A represents the view which the observer would see through the eyepiece 13 (Figures 2 and 3) of the instrument.

The instrument will be more specifically described later; it is sufficient here to point out that the instrument rotatable about the same axis as the azimuth scale 10 is adapted to be sighted on a celestial object; the pointer 12 corresponds to the index line 12 visible in the eyepiece; the portion of the azimuth scale 10 adjacent the index line 12 is also visible in the eyepiece 13 and a vertical indexing means such as the image of bubble 14 and its registry with index line 19 is also visible in the eyepiece 13.

The lubber line 16 is arranged on a stationary portion of the instrument on the size of azimuth scale 10 indicated by the sighting index when the line of sight is toward the nose 17 of the ship and aligned with the nose of the ship.

Figures 4 and 4A show a random setting for the elements of my device.

The azimuth scale 10 is to be viewed from below. Since the computation is with respect to angles measured counterclockwise from the north point looking down from the zenith, the scale is arranged with clockwise graduations. By this means the automatic subtraction $TA - RB$ may be made to produce a direct reading of true heading.

A comparison of Figures 1A and 1B will show how the counterclockwise arrangement of the azimuth scale makes an automatic subtraction possible to achieve a true heading result.

Again, the apparent clockwise arrangement of scale 10 in Figures 3 to 6A results from the fact that these scales are viewed from below.

When the true azimuth of the sighted object is determined the azimuth scale 10 is rotated about its axis 11 to the position of Figure 5 where the true azimuth (in this case 315°) is set against the lubber line 16. An automatic computing device may be utilized to determine this true azimuth and make the setting and to maintain a correct true azimuth setting at all times thereafter for the particular object.

Figure 5 and the eyepiece view of Figure 5A now show the azimuth scale 10 set for the true azimuth of the particular celestial object assumed in the diagrammatic illustration of Figure 1. The line of sight index line 12 is still set at the original random position of Figures 4 and 4A.

Now the navigator rotates the instrument while the azimuth scale 10 remains stationary until the selected celestial object 20 is brought into view and centered in the eyepiece 13 as seen in Figures 6 and 6A. The line of sight index or pointer 12 rotates with the instrument and registers with celestial object 20. At the same time, the index 12 traverses the azimuth scale 10.

When the index 12 is lined up with the object 20, it is also lined up with the particular mark on the scale 10 which indicates the true heading of the craft (Figures 6 and 6A).

By this means, step 1 (moving scale 10 from the random position of Figure 4 to the position of Figure 5) sets the device for the known or computed true azimuth of the celestial object 20; step 2 (lining up the index 12 as in Figure 6 with the sighted object 20) performs an automatic subtraction of relative bearing from true azimuth. The scale then reads (Figure 6A) in terms of true heading.

*Combination of true heading indication and periscopic sextant*

My novel periscopic sextant of the general type shown in Patent No. 2,579,903 and the mount therefor shown in Patent No. 2,554,010 are particularly adapted for modification to function as an astrocompass or true heading indicator in addition to performing their original function of determining position.

The azimuth scale 10 is mounted rotatably on the lower side of the mount 25 (Figure 2) around the opening 26 in the mount through which the tube 27 of the periscopic sextant is inserted. The mount 25 is affixed to the roof of the craft as shown in said Patent No. 2,554,010, the opening 26 extending through the mount 25 and to the outside. The outer end of opening 26 is provided with a cover (not shown) operated by handle 30 in the manner described in said patent. The handle 30 may be operated to open the cover or hatch and the sextant tube 27 may be inserted into opening 26 so that a portion thereof projects above the roof of the craft. The sextant tube 27 is releasably held in the mount for rotation about its own vertical axis and may be swung on the universal gimbals supported in and a part of the mount, all as shown in said Patent No. 2,554,010. The scale 10 may be rotatably supported on the under side of the mount so that it swings on the universal gimbals with tube 27 as shown in substantially the manner that ring 34 is supported in said patent.

It will be seen that the azimuth scale 10 and the vertical tube 27 of the sextant have the same vertical axis of rotation so that the index line in the sextant may be used as the index line 12 (Figures 4 to 6 and 4A to 6A) against which true heading may be read.

It is in fact the periscopic construction of the sextant which makes it possible to rotate it on a common axis with the azimuth scale 10 which in turn makes it possible to turn the periscopic sextant into an efficient and simple astrocompass.

When the periscopic sextant tube 27 is inserted in the mount in operative position, light from any celestial object to which the sextant is directed enters window 35 (Figure 3) and the index prism 36. The index prism 36 is rotatable about a horizontal axis to permit observation at any angle from −10° to +92° elevation. The rotation of the index prism 36 is controlled by worm 38 and sector 39 which rotate lever 40 about a horizontal axis. The motion of lever 40 is transmitted by rod 41 to lever 42 which in turn is connected to prism 36. The worm 38 is carried on shaft 43 which is controlled by knob 44 to displace the objective image at the rate of five degrees per revolution. A counter (not shown) may be connected to shaft 43 to indicate the altitude angle in degrees and minutes.

The light reflected from prism 36 passes through the objective lenses 45 and 46 and the objective field lens 47 and through an erecting system comprising lenses 48 and 49. The light from object 20 is then directed toward the eyepiece 13 by means of the 90° fixed prism 50 and forms a real image at the focal plane of the erecting system. The focal plane of the eyepiece system comprising lenses 51 and 52 coincides with the focal plane of the erecting system. A reticle 55 carrying horizontal line 19 (for cooperation with the vertical reference or artificial horizon—see Figure 4A) and a vertical line 12 (the true heading index—see Figure 4A) is located at the common focal plane of the erecting and eyepiece optical systems, the two lines 19 and 12 crossing in the center of the field.

The artificial horizon is the bubble 14 in the fluid in the transparent reservoir 60 with a bottom sealing plate 61. The image of bubble 14 passes down through lens 62 and through the pellicle 63 which is a beam splitting partially reflecting and partially transparent member. The bubble image is reflected by the retro-reflector 65 to the pellicle 63 and into the eyepiece lens system and eyepiece 13. The image of object 20 and bubble 14 may then be superimposed in the eyepiece. Appropriate manipulation of the instrument will be superpose the image of the object 20 in the center of the image of the bubble and the center of the image of the bubble on the intersection of lines 12 and 19 as seen in Figure 6A. This manipulation includes (1) swinging the sextant in the gimbal mount to maintain the bubble on the intersection of lines 19 and 12, (2) rotation of the sextant to align window 35 so that it is directed toward object 20 with line 12 on object and (3) rotation of knob 44 to bring the image of object 20 to the center of the bubble image on the intersection of lines 19 and 12. The altitude of object 20 may then be read on the counter operated by shaft 43 and the true heading may also be read in the same eyepiece (see Figure 6A) owing to the optical arrangement which is provided for transmitting an image of a portion of scale 10 into the eyepiece lens system.

The bubble chamber in which is mounted reservoir 60 for the bubble carries lens system 71, 72, 73 which superposes the relevant portion of azimuth scale 10 (compare Figures 3 and 4A) on the same plane as the bubble. The magnified relevant portion of the scale 10 is consequently visible in the eyepiece 13 with the bubble 14, the celestial object 20 and the reticle lines 19 and 12. When the object and bubble are collimated at the center of the field, the vertical reticle line 12 acts as an index against the scale.

Thus, when true azimuth of object 20 is set by rotating scale 10 so that the azimuth of the object lies against lubber line 16, and the sextant is then sighted on the object 20, true heading is immediately indicated in the eyepiece (see Figure 6A).

As above noted, the true azimuth may be set against the lubber line 16 by manually rotating scale 10 or by rotating a knob Q to rotate a pinion Q which meshes with a gear 80 which either carries scale 10 or my be integral with the plate on which the scale 10 is marked.

Since there may not be enough light in the interior of the craft properly to illuminate bubble 14 and the portion of scale 10 above bubble 14 (this is the only relevant portion of the scale) a local source of illumination such as a light bulb 82 may be provided to illuminate the bubble 14 either within chamber 70 or through a transparent portion of wall 83 and to illuminate the relevant portion of scale 10. This local source of illumination may be housed in the instrument but should be isolated from tube 27 so that it will not interfere with the relatively less intense light from object 20.

A shutter may be provided operated by handle 85 (Figure 2) to close the light path from scale 10 should no heading indication be required. Appropriate means may also be provided as, for instance, knob 84 to adjust the bubble. These and other elements shown in Figures 2 and 3 relate only to the operation of the sextant as a sextant and require no further description here since my present invention is directed only to the utilization and adaptation of the periscopic sextant as a true heading indicator.

It will thus be seen that, to use the periscopic sextant as an astrocompass, the scale 10 must be provided on the mount with appropriate means for setting the scale and the optical system of the sextant must be modified to present in the eyepiece the relevant portion of the scale 10.

Instead of requiring an astrodome and the standard complex and bulky gyrocompass structure, the single periscopic sextant, its mount and small hatch opening may be used not only as a sextant is used but may also simultaneously provide the true heading indication when a simple initial manipulation of scale 10 is made to set it for the computed or known true azimuth of the celestial object on which a sight is taken.

By this means, therefore, many complex navigational problems are reduced to simple manipulation. The problem of determining location and the problem of determining true heading are performed by the same instrument and may be performed at the same time and with a single reading at the eyepiece.

*The adaptation of mechanical computation for automatic setting and maintenance of the true azimuth to make possible instantaneous determination of true heading*

Pinion Q may be operated by a computer connected to a drive member 100 supported by the sextant mount 25; the output of the computer apparatus drives gear 101 which drives pinion Q. The computer preferably is remotely mounted and drives a synchro which is connected to a synchro in housing 100. The computer is set for local latitude and longitude and the star's position, the latter being continuously corrected for the earth's rotation by clockwork. The resulting output to gear 101 transmitted to scale 10 by pinion Q is the true azimuth of the selected star.

The computer must, therefore, duplicate certain of the conditions of Figure 1.

In Figure 7 I have shown schematically the basic requirements of a computer for accomplishing the functions outlined above.

Within the mechanism an arbitrary direction (a vertical line 105 in Figure 7) is taken as the zenith of the local geographical position. This line need not necessarily be vertical in the mechanism but is the arbitrary vertical reference line of the computer. All other axes and measurements are taken from the zenith-nadir axis 105, the end result being the setting up of a mechanism which represents the celestial sphere at any given moment as viewed from a given geographical position.

Thus, the polar axis 106 is set about an east-west axis 107 at an angle from the zenith-nadir axis 105 which angle is determined by the local latitude and is, in fact, the complement of the local latitude.

To achieve this initial operation, a platform or carriage 110 is mounted for rotation on a shaft 107a which is parallel to the east-west axis 107, the bearing ends 108, 109 of the shaft being located along the east-west axis 107 so that rotation of platform 110 is about said axis. The plane of platform 110 is perpendicular to the polar axis 106. Shaft end 109 carries gear 112 which engages gear 113 on drive shaft 114. Suitable input mechanism 115 operates shaft 114 to rotate platform 110 about east-west axis 107 to effect a setting of platform or carriage 110 which corresponds to latitude.

Mechanism 115 may be a simple manually operated knob with an appropriate index to indicate the latitude setting of platform 110 achieved by rotation of knob 115; or it may be a synchro motor slaved to a remote latitude determining or setting device.

A direction arm 120 rotates with shaft 122 about the zenith-nadir axis 105 at the point of intersection 121 of the zenith-nadir axis 105, the polar axis 106 and the east-west axis 107. The shaft 107a is off-set in the diagrammatic illustration of Figure 7 so that the point 121 may be in the east-west axis 107 as well as in the other axes. The arm 120 is fixed to shaft 122 which is rotatable in bearings 123, 124 (for purposes to be described immediately below) on carriage 145. Carriage 145 is mounted on a plate. Plate 125 carries or comprises a gear 126 which is engaged by gear 127 on shaft 128. Shaft 128 may be driven by operating mechanism 129 which may be a knob with an appropriate index for manually setting the direction arm for hour angle, or time, or which may be a synchro appropriately slaved to another synchro which in turn is connected to an automatic or manual direction setting apparatus. Shaft 128 is on an axis 106′ parallel to polar axis 106.

Direction arm 120 is also rotatable with shaft 122 to obtain a setting for the declination of the star. Shaft 122 carries gear 130 which meshes with gear 131 on shaft 132 which in turn is driven by member 133 which may be a manual setting device or an electro-mechanical setting device.

The carriage 145 is also rotatable in its plane by gear 135 for setting for longitude and may be continuously rotated by clockwork as hereinafter described for a setting for time. Gear 135 is mounted on plate 125, and engages rim gear 146 of carriage 145.

The star arm 120 is now set for declination, altitude, latitude, longitude and time; and its angle with respect to the polar axis represents the direction of the star which can be translated to read (as hereinafter pointed out) with respect to the zenith-nadir axis 105 in terms of azimuth of the star.

The plane passing through the polar axis 106 and the zenith-nadir axis 105 represents the meridian of the given geographic position or local longitude. At any instant the position of arm 120 may be set to correspond to the actual dihedral angle between the plane defined by the pole, the zenith and point 121 and the plane defined by the pole, the star and point 121.

This is illustrated in Figure 7C.

To simulate the rotation of the earth within the celestial sphere, clockwork is added to the mechanism to drive the star arm at a rate equal (by the choice of suitable gear ratios) to either solar or sidereal time.

The star arm 120 is thus driven by actually rotating plate 125 in its plane as seen by a comparison of Figures 7A and 7B.

After the initial setting of the mechanism, the arm 120 is thus continuously driven in the direction and at the rate of the apparent motion of the sun, planet or star chosen for sighting.

New settings of latitude and longitude must be made in accordance with changes in geographical position before each observation.

Thus, with the clockwork in operation and a particular star previously selected and set by members 129 and 133, then prior to each observation for a true heading, the navigator must adjust the latitude knob 115 and longitude gear 135. These two elements may be adjusted automatically by synchros slaved to other instruments.

The motion of arm 120 must then be translated into corresponding motion of azimuth scale 10. Since gear 101 is connected to scale 10, then the motion of arm 120 must be translated into corresponding motion of gear 101. Gear 101 is rotatable only about the assumed vertical axis 105.

Gear 101 carries arcuate bail 140 shown in the South-North direction, and which is rotatable with gear 101. Bail 140 is engaged by arm 120. As arm 120 is subjected to all the combined motions of longitude gear 135, latitude knob 115, hour angle knob 129, declination knob 133 and the clockwork which also drives plate 110, only the motion of the star arm 120 about the "vertical" axis, in azimuth, is communicated to the bail and hence to the gear 101.

Gear 101 may be directly connected by pinion Q to azimuth scale 10 as indicated generally in Figure 2.

Preferably, the housing 100 in Figure 2, instead of carrying the computer mechanism, carries a synchro, the output gear 101 of which is driven exactly in step with gear 101 of the computer mechanism and hence has been given the same reference number.

Since only the motion of the star in azimuth is transmitted, the scale 10 is moved only in azimuth.

During any altitude motion of the star, such as rising and setting, the arm rides along the bail and no motion is transmitted.

As above described, a gear, synchro rotor or other angle measuring device is coupled or rigidly attached to the bail, rotating about the vertical axis, its angular displacement from a null or starting position set for "north" thus representing the position of the star in azimuth.

When a synchro rotor is driven by the bail, its angular position may be transmitted to a follow-up synchro set near the mount, a motor driven by the second synchro being utilized to set the mount azimuth scale.

Further information may be obtained from the computer. At any given moment the angular distance of the star arm from the zenith point is the complement of the altitude of the selected star. This angle is measurable in several ways. A curved sector may be carried along the bail by the star arm. This sector may engage a pinion whose rotation thus becomes a function of altitude.

The relationship of true azimuth, relative bearing and true heading as established on the mount may easily be translated into terms of shaft positions for remote transmission of true heading. For example, in a synchro differential, the stator might be rotated with the mount scale to a position representing true azimuth and the rotor then positioned by the sextant rotation to subtract relative bearing, the resultant angular difference thus representing true heading. This indication might be used in one of several ways: for visual direct comparison with the magnetic compass, directional gyro or other direction indicating device; for monitoring the automatic pilot steering through a null mechanism; for slaving the gyro mechanism of gyros normally slaved to the magnetic compass; and for monitoring any computers which employ heading as one input.

These indications of true heading must of necessity be occasional, transmitted only when the sextant is trained on the star. To this end a switch next to the mount may be employed to close the circuit when the navigator is taking his observation.

By this means, therefore, a simplified apparatus is provided for determining true heading; the need for an astrodome is obviated; and the periscopic sextant may now perform both the function of determining location and the function of determining heading.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A true heading indicator comprising a sighting member rotatable on a vertical axis; a circular scale rotatable in a plane normal to said vertical axis and about said vertical axis; said sighting member having an optical system movable therewith for simultaneously viewing a celestial object to be sighted thereby and a portion of said scale; said optical system having a vertical optical axis coincident with the vertical axis about which the sighting member is rotatable; said sighting member having an index alignable simultaneously with the object sighted and a portion of the scale; said index being also visible in said optical system; said scale having a graduated series of numerical indicia arranged counterclockwise when viewed from above said scale.

2. A true heading indicator comprising a sighting member rotatable on a vertical axis; a circular scale rotatable in a plane normal to said vertical axis and about said vertical axis; said sighting member having an optical system movable therewith for simultaneously viewing a celestial object to be sighted thereby and a portion of said scale; said optical system having a vertical optical axis coincident with the vertical axis about which the sighting member is rotatable; said sighting member having an index alignable simultaneously with the object sighted and a portion of the scale; said index being also visible in said optical system; said scale having a graduated series of numerical indicia arranged counterclockwise when viewed from above said scale, and a horizontal reference element; said horizontal reference element being also visible in said optical system.

3. A true heading indicator comprising a sighting member rotatable on a vertical axis; a circular scale rotatable in a plane normal to said vertical axis and about said vertical axis; a member carrying a reference corresponding to a fixed mark element of a vehicle in which the true heading indicator is used; said circular scale being rotatable with respect to said reference mark and being registerable therewith; said sighting member having an optical system movable therewith for simultaneously viewing a celestial object to be sighted thereby and a portion of said scale; said optical system having a vertical optical axis coincident with the vertical axis about which the sighting member is rotatable; said sighting member having an index alignable simultaneously with the object sighted and a portion of the scale; said index being also visible in said optical system; said scale having a graduated series of numerical indicia arranged counterclockwise when viewed from above said scale.

4. A true heading indicator comprising a sighting member rotatable on a vertical axis; a circular scale rotatable in a plane normal to said vertical axis and about said vertical axis; a member carrying a reference corresponding to a fixed mark element of a vehicle in which the true heading indicator is used; said circular scale being rotatable with respect to said reference mark and being registerable therewith; said sighting member having an optical system movable therewith for simultaneously viewing a celestial object to be sighted thereby and a portion of said scale; said optical system having a vertical optical axis coincident with the vertical axis about which the sighting member is rotatable; said sighting member having an index alignable simultaneously with the object sighted and a portion of the scale; said index being also visible in said optical system; said scale having a graduated series of numerical indica arranged counterclockwise when viewed from above said scale, the numerical indicia on said scale comprising a counterclockwise arrangement of a compass rose, when viewed from above.

5. A true heading indicator comprising a sighting member rotatable on a vertical axis; a circular scale rotatable in a plane normal to said vertical axis and about said vertical axis; a member carrying a reference corresponding to a fixed mark element of a vehicle in which the true heading indicator is used; said circular scale being rotatable with respect to said reference mark and being registerable therewith; said sighting member having an optical system movable therewith for simultaneously viewing a celestial object to be sighted thereby and a portion of said scale; said optical system having a vertical optical axis coincident with the vertical axis about which the sighting member is rotatable; said sighting member having an index alignable simultaneously with the object sighted and a portion of the scale; said index being also visible in said optical system; said scale having a graduated series of numerical indicia arranged counterclockwise when viewed from above said scale, the numerical indicia on said scale comprising a counterclockwise arrangement of a compass rose, when viewed from above, said scale being rotatable to set the numerical value of the clockwise angle (when looking down) from the north point of the horizon of a celestial object to be sighted against the reference mark; said sighting member being rotatable to set the index on the celestial object and at the same time set said index on the graduation of the scale which indicates the numerical value of the angle clockwise (when looking down) of the said element of the vehicle from the north point of the horizon.

6. A true heading indicator comprising a sighting member rotatable on a vertical axis; a circular scale rotatable in a plane normal to said vertical axis and about said vertical axis; a member carrying a reference corresponding to a fixed mark element of a vehicle in which the true heading indicator is used; said circular scale being rotatable with respect to said reference mark and being registerable therewith; said sighting member having an optical system movable therewith for simultaneously viewing a celestial object to be sighted thereby and a portion of said scale; said optical system having a vertical optical axis coincident with the vertical axis about which the sighting member is rotatable; said sighting member having an index alignable simultaneously with the object sighted and a portion of the scale; said index being also visible in said optical system; said scale having a graduated series of numerical indicia arranged counterclockwise when viewed from above said scale, the numerical indicia on said scale comprising a counterclockwise arrangement of a compass rose, when viewed from above, said scale being rotatable to set the numerical value of the clockwise angle (when looking down) from a selected point of the horizon of a celestial object to be sighted against the reference mark; said sighting member being rotatable to set the index on the celestial object and at the same time set said index on the graduation of the scale which indicates the numerical value of the angle clockwise (when looking down) of the said element of the vehicle from said selected point of the horizon.

7. A true heading indicator comprising a sighting member rotatable on a vertical axis; a circular scale rotatable in a plane normal to said vertical axis and about said vertical axis; a member carrying a reference corresponding to a fixed mark element of a vehicle in which the true heading indicator is used; said circular scale being rotatable with respect to said reference mark and being registerable therewith; said sighting member having an optical system movable therewith for simultaneously viewing a celestial object to be sighted thereby and a portion of said scale; said sighting member having an index alignable simultaneously with the object sighted and a portion of the scale; said optical system having a vertical optical axis coincident with the vertical axis about which the sighting member is rotatable; said index being also visible in said optical system; said scale having a graduated series of numerical indicia arranged counterclockwise when viewed from above said scale, the numerical indicia on said scale comprising a counterclockwise arrangement of a compass rose, when viewed from above, said scale being rotatable to set the numerical value of the clockwise angle (when looking down) from a selected point of the horizon of a celestial object to be sighted against the reference mark; said sighting member being rotatable to set the index on the celestial object and at the same time set said index on the graduation of the scale which indicates the numerical value of the angle clockwise (when looking down) of the said element of the vehicle from said selected point of the horizon; said counterclockwise (when looking down) arrangement of the scale causing said operations to produce a subtraction of the angle between said element of the vehicle and the celestial object from the angle between the celestial object and the selected point of the horizon to produce a reading at the index in the optical system of the angle between the said element of the vehicle and the selected point of the horizon, all of said angles being measured clockwise looking down, said last mentioned angle being the value of the true heading of a line drawn from said vertical axis to and through the said element of the vehicle with respect to said selected point of the horizon.

8. A true heading indicator as in claim 7 wherein said sighting member is a periscopic sextant having a periscopic tube, the vertical axis of rotation thereof coinciding with the vertical axis of the periscopic tube; a support for unlimited rotation of said tube about said vertical axis; said support permitting limited universal rotation to establish and maintain registry with said horizontal reference; said support also carrying said reference mark and rotatably carrying said scale.

9. An astrocompass comprising a sighting device; said sighting device having a tube; means for supporting and indexing said tube to a vertical position; said tube being rotatable about its axis in a horizontal plane of rotation; a sighting member carried at the upper end of said tube; said sighting member being rotatable in a vertical plane of rotation; an optical system carried by said tube for viewing the image received by said sighting member; said optical system having a vertical optical axis coincident with the vertical axis about which the sighting member is rotatable; an index line on an element of said optical system indicating the center in azimuth of the field of view of the sighting member; a compass rose carried in a horizontal plane and surrounding said tube; said compass rose being arranged with the west mark 90° clockwise from the north mark when looking down, and an additional optical system for bringing an image of the portion of the compass rose alined in azimuth with the center of the sighting member into view in the first mentioned optical system simultaneously with the image received by the sighting member.

10. An astrocompass comprising a sighting device; said sighting device having a tube; means for supporting and indexing said tube to a vertical position; said tube being rotatable about its axis in a horizontal plane of rotation; a sighting member carried at the upper end of said tube; said sighting member being rotatable in a vertical plane of rotation; an optical system carried by said tube for viewing the image received by said sighting member; said optical system having a vertical optical axis coincident with the vertical axis about which the sighting member is rotatable; an index line on an element of said optical system indicating the center in azimuth of the field of view of the sighting member; a compass rose carried in a horizontal plane and surrounding said tube; said compass rose being arranged with the west mark 90° clockwise from the north mark when looking down, and an additional optical system for bringing an image of the portion of the compass rose alined in azimuth with the center of the sighting member into view in the first mentioned optical system simultaneously with the image received by the sighting member, said index line overlying, in the image received by the first mentioned optical system, the center of said portion of the image of the compass rose.

11. An astrocompass comprising a sighting device; said sighting device having a tube; means for supporting and indexing said tube to a vertical position; said tube being rotatable about its axis in a horizontal plane of rotation; a sighting member carried at the upper end of said tube; said sighting member being rotatable in a vertical plane of rotation; an optical system carried by said tube for viewing the image received by said sighting member; said optical system having a vertical optical axis coincident with the vertical axis about which the sighting member is rotatable; an index line on an element of said optical system indicating the center in azimuth of the field of view of the sighting member; a compass rose carried in a horizontal plane and surrounding said tube; said compass rose being arranged with the west mark 90° clockwise from the north mark when looking down, and an additional optical system for bringing an image of the portion of the compass rose alined in azimuth with the center of the sighting member into view in the first mentioned optical system simultaneously with the image received by the sighting member, said index line overlying, in the image received by the first mentioned optical system, the center of said portion of the image of the compass rose; said compass rose being rotatable about the tube; a stationary support for said compass rose; a lubber line on said support corresponding to a preselected local reference direction; said compass rose being rotatable to set a desired mark thereon against said lubber line prior to taking a sight.

12. An astrocompass comprising a sighting device; said sighting device having a tube; means for supporting and indexing said tube to a vertical position; said tube being rotatable about its axis in a horizontal plane of rotation; a sighting member carried at the upper end of said tube; said sighting member being rotatable in a vertical plane of rotation; an optical system carried by said tube for viewing the image received by said sighting member; said optical system having a vertical optical axis coincident with the vertical axis about which the sighting member is rotatable; an index line on an element of said optical system indicating the center in azimuth of the field of view of the sighting member; a compass rose carried in a horizontal plane and surrounding said tube; said compass rose being arranged with the west mark 90° clockwise from the north mark when looking down, and an additional optical system for bringing an image of the portion of the compass rose alined in azimuth with the center of the sighting member into view in the first mentioned optical system simultaneously with the image received by the sighting member, said index line overlying, in the image received by the first mentioned optical system, the center of said portion of the image of the compass rose; said compass rose being rotatable about the tube; a stationary support for said compass rose; a lubber line on said support corresponding to a preselected local reference direction; said compass rose being rotatable to set a desired mark thereon against said lubber line prior to taking a sight, said mark corresponding to the true azimuth of a celestial body to be sighted.

References Cited in the file of this patent

UNITED STATES PATENTS

| | | |
|---|---|---|
| 538,889 | Arvidson | May 7, 1895 |
| 699,450 | Christensen | May 6, 1902 |
| 2,028,063 | Green | Jan. 14, 1936 |
| 2,059,944 | Green | Nov. 3, 1936 |
| 2,155,402 | Clark | Apr. 25, 1939 |
| 2,189,790 | Gardner et al. | Feb. 13, 1940 |
| 2,220,945 | Naecker | Nov. 12, 1940 |
| 2,266,741 | Crane et al. | Dec. 23, 1941 |
| 2,389,142 | Esval et al. | Nov. 20, 1945 |
| 2,441,636 | Kaufman et al. | May 18, 1948 |
| 2,462,925 | Varian | Mar. 1, 1949 |
| 2,532,324 | Milligan | Dec. 5, 1950 |
| 2,575,166 | Dunaway et al. | Nov. 13, 1951 |
| 2,609,606 | Draper et al. | Sept. 9, 1952 |
| 2,612,693 | Schonstedt | Oct. 7, 1952 |
| 2,660,794 | Goertz et al. | Dec. 1, 1953 |

FOREIGN PATENTS

| | | |
|---|---|---|
| 2,041 | Great Britain | of 1877 |
| 30,583 | Great Britain | of 1909 |
| 450,489 | Great Britain | July 20, 1936 |